United States Patent
Mannheim Astete et al.

(10) Patent No.: US 12,172,410 B2
(45) Date of Patent: Dec. 24, 2024

(54) GLASS LAMINATE WITH THIN INSERT OBSCURATION HAVING SUPERIOR STRENGTH AND OPTICAL QUALITY

(71) Applicant: AGP America S.A., Ciudad de Panama (PA)

(72) Inventors: Mario Arturo Mannheim Astete, Lima (PE); Charles S. Voeltzel, Lima (PE); Laura Granados Caro, Lima (PE); Andres Fernando Sarmiento Santos, Lima (PE); Elena K. Mendoza Carranza, Lima (PE); Ivan Arturo Cornejo, Lima (PE)

(73) Assignee: AGP America S.A., Panama (PA)

( * ) Notice: Subject to any disclaimer, the term of this patent is extended or adjusted under 35 U.S.C. 154(b) by 25 days.

(21) Appl. No.: 16/651,252

(22) PCT Filed: Sep. 29, 2018

(86) PCT No.: PCT/IB2018/057595
§ 371 (c)(1),
(2) Date: Mar. 26, 2020

(87) PCT Pub. No.: WO2019/064281
PCT Pub. Date: Apr. 4, 2019

(65) Prior Publication Data
US 2020/0290319 A1    Sep. 17, 2020

Related U.S. Application Data

(60) Provisional application No. 62/566,254, filed on Sep. 29, 2017, provisional application No. 62/612,424, filed on Dec. 30, 2017.

(30) Foreign Application Priority Data

Mar. 2, 2018  (CO) .......................... NC2018/0002418

(51) Int. Cl.
*B32B 17/10*      (2006.01)
*B32B 1/00*       (2006.01)
(Continued)

(52) U.S. Cl.
CPC .......... *B32B 17/10348* (2013.01); *B32B 1/00* (2013.01); *B32B 5/142* (2013.01);
(Continued)

(58) Field of Classification Search
CPC ........... B32B 5/145; B32B 3/26; B32B 3/263; B32B 17/06; B32B 17/10;
(Continued)

(56) References Cited

U.S. PATENT DOCUMENTS

| | | | | |
|---|---|---|---|---|
| 5,239,406 A | * | 8/1993 | Lynam | .............. B32B 17/10339 359/275 |
| 2001/0019759 A1 | * | 9/2001 | Barattucci | ......... B32B 17/10348 428/192 |

(Continued)

FOREIGN PATENT DOCUMENTS

| | | |
|---|---|---|
| EP | 1106343 A1 | 6/2001 |
| EP | 1464632 B1 | 3/2010 |

(Continued)

*Primary Examiner* — Megha M Gaitonde
(74) *Attorney, Agent, or Firm* — The Morales Law Firm; Joseph L. Morales, Esq.

(57) ABSTRACT

Black enamel frit obscurations are commonly printed on laminated and tempered automotive safety glazing where they serve to hide the adhesive used to bind the glazing to the automotive body and to protect the adhesive from ultraviolet radiation. However, frit has a number of drawbacks. Frit weakens the surface of the glass. It can create distortion in the glass due to thermal gradients. Printed frit obscurations are incompatible and cannot be used with many types of coatings. Standard frit blocks ion exchange and cannot be used with the chemical tempering process. In (Continued)

addition, while many types of frits are available for printing on soda-lime glass, there are very few, if any, for non-soda lime glass. As the market moves towards thinner and lighter glazing, non-soda lime glass types are finding increasing application in automotive glazing. These limitations are overcome by replacing the printed black obscuration with an obscuration formed from a thin sheet of plastic, which is integrated into the laminate. This results in a laminate having superior optical quality, higher strength and a lower probability of breakage as compared to a laminate with a black enamel frit obscuration.

21 Claims, 15 Drawing Sheets

(51) Int. Cl.
  *B32B 5/14* (2006.01)
  *B32B 27/30* (2006.01)
  *B32B 27/36* (2006.01)
  *B60J 1/00* (2006.01)

(52) U.S. Cl.
  CPC .. *B32B 17/10036* (2013.01); *B32B 17/10467* (2013.01); *B32B 17/10761* (2013.01); *B32B 27/306* (2013.01); *B32B 27/36* (2013.01); *B60J 1/00* (2013.01); *B32B 2250/40* (2013.01); *B32B 2307/416* (2013.01); *B32B 2605/006* (2013.01)

(58) Field of Classification Search
  CPC ........ B32B 17/10348; B32B 17/10036; B32B 17/10275; B32B 17/10568; B32B 17/1066; B32B 17/10761; B32B 2605/00; B32B 2605/006; Y10T 428/24479
  USPC ......................................................... 428/156
  See application file for complete search history.

(56) References Cited

U.S. PATENT DOCUMENTS

| | | | |
|---|---|---|---|
| 2005/0142332 | A1 | 6/2005 | Sauer |
| 2005/0153106 | A1* | 7/2005 | Lansberry ........... B32B 17/1055 428/195.1 |
| 2006/0210776 | A1* | 9/2006 | Lu ..................... B32B 17/10568 428/192 |
| 2007/0148472 | A1* | 6/2007 | Masaki ............. B32B 17/10568 428/426 |
| 2016/0243796 | A1* | 8/2016 | Mannheim Astete ...................... B32B 17/1077 |
| 2016/0354996 | A1* | 12/2016 | Alder ................ B32B 17/10174 |

FOREIGN PATENT DOCUMENTS

| | | |
|---|---|---|
| EP | 1193048 B2 | 9/2014 |
| EP | 3095601 A1 | 11/2016 |
| GB | 2264452 A | 9/1993 |

* cited by examiner

GLASS LAMINATE WITH THIN INSERT OBSCURATION HAVING SUPERIOR STRENGTH AND OPTICAL QUALITY

FIELD OF THE INVENTION

The presently disclosed invention is directed to a laminated automotive glazing having an obscuration that has superior optical quality and strength as well as the method used to create said glazing.

BACKGROUND OF THE INVENTION

Black enamel frit obscurations are commonly printed on laminated and tempered automotive safety glazing. These obscurations have multiple functional and aesthetic requirements. The obscuration must be substantially opaque. This is needed to prevent the adhesive, used to mount the glazing to the vehicle, from being seen from the outside of the vehicle and to protect the adhesive from the harmful effects of ultra-violet. The obscuration also serves this same function for components attached to the inside surface of the glazing. On heated and coated glazing, the obscuration is used to hide the edge of the coating, bus bars, leads and any other items that would detract from the appearance of the vehicle. The obscuration also has the additional aesthetic requirement that it have a dark black color and a reflective glossy appearance. It must last for the life of the glazing, without fading, leaking, having a reduction in adhesion or otherwise failing.

The obscurations are usually printed on the surface number four of glass on the inside of the vehicle but are sometimes also or alternately printed on the surface number two of glass.

Obscurations have historically been black. One of the reasons for this comes from the limitations imposed by ceramic frits. It is difficult to produce frits, in colors other than black, that have the durability needed and for which the color can be reliably replicated from run to run. The other reason is that a black obscuration can be used with any color of paint.

Black enamel frits are comprised of pigments, a carrier, binders and finely ground glass. Other materials are also sometimes added to enhance certain properties: the firing temperature, anti-stick, chemical resistance, etc. The black frit is applied to the glass using a silk screen or ink jet printing process prior to heating and bending. During the bending process, the finely ground glass in the frit soften and fuses with the glass surface. The frit is said to be "fired" when this takes place. This is very similar to the process used to apply enamel finishes on bathroom fixtures, pottery, china and appliances.

Metals and many other types of materials have an ultimate yield strength at which point the material will fail. However, with glass we can only specify a probability of breakage for a given value of stress. Looking at glass at the molecular level, we would expect the strength to be very high. In fact, what we find in practice is that glass has a very high compressive strength, as expected, but very low tensile strength.

For a given set of glass test specimens, with identical loading, the point of failure at first glance might appear to be a random variable. In fact, the yield point follows a Weibull distribution and the probability of breakage can be calculated as a function of, stress, duration, surface area, surface defects and the modulus of glass.

To the naked eye, float glass appears to be near perfect. Any defects that may be present could be so small as it would not be visible. But, in fact, at the microscopic level, the surface appears rough and can be seen to be dotted with flaws. When the glass is placed in tension, these surface defects tend to open up and expand, eventually leading to failure. Therefore, laminated automotive glass almost always fails in tension. Even when not in tension, the surface defects react with the moisture in the environment and slowly "grow" over time. This phenomenon is known as slow crack growth. As a result, glass weakens as it ages.

A fired black frit increases surface defects. This can be seen if the black pigment of a fired black obscuration is chemically dissolved. The surface of glass will have a frosted appearance, similar to sand blasted or chemically etched glass. The frosted appearance is due to the myriad surface defects present from the fused glass. This makes the surface weaker increasing the probability of breakage. Testing has shown that glass with black frit fails at a stress level that is substantially lower than glass that does not have black frit.

Another problem arises from the thermal gradients that occur during the bending process. As one would expect, the black frit absorbs more radiant heat than the clear glass. Radiant heat is the predominant heat source used for glass bending. The black frit areas of the glass run hotter than the adjacent clear areas. With glass being a poor conductor of heat, gradients in the tens of degrees centigrade can arise over a short distance. These high abrupt thermal gradient on the surface result in optical distortion and high residual along the inner edge of the black band. This is known as the "burn" line in the industry. This can often be seen along the edges of the black obscuration found along the edges of most windshields.

As shown in FIG. 1, obscurations used with glass mounted camera systems are forced to designate a "buffer" zone 15 between the edge of the camera field of view 16 and the edge of the black frit 34, 8 to exclude the burn line. This is an accommodation required due to the limitations of the black frit. The ideal would be to have no buffer zone 15 as the larger obscuration reduces the driver field of view and the natural light entering the vehicle.

One method used to address the burn line problem is the dot fadeout. Starting at the inner solid edge of the black paint, rows of increasingly smaller dots are painted on the glass. This is the same principle as used in greyscale printing. This reduces the rate of change in the surface temperature, spreading it over a wider area. The dot fadeout also helps to hide the distortion. However, on some parts, even a wide dot fadeout is not sufficient to eliminate all distortion. A wide dot fadeout also may not be possible depending upon the size of the opening and the regulatory requirements for driver vision. Dot fadeout patterns are also undesirable in that they increase the production cost of the glazing.

Another problem is surface mismatch. A laminate is comprised of at least two layers of glass. The frit is typically applied to only one of the glass layers. This can result is a slight difference in the shape of the surfaces. When the two surfaces are forced together during lamination, the mismatch results in residual stress in the laminate and optical distortion.

Even with these drawbacks, the area of the windshield with a black frit obscuration has increased in recent years.

As the electronic content of modern vehicles has increased, the area of the windshield, near the top center, has become increasingly crowded. Before it was provided with just the rear-view mirror, we now find a wide array of electronic equipment mounted in this location.

The use of cameras, requiring a wide field of view and a high level of optical clarity, is also growing at a rapid rate with the introduction of vehicles with various levels of autonomous operating capacity. The resolution of the cameras is also increasing at an equally fast rate. These typically must be mounted on the windshield in the wiper area. Early initial applications were for night-vision. Today, camera based systems are used to provide a wide array of safety functions including adaptive cruise control, obstacle detection, lane departure warning and support for autonomous operation. Many of these applications require the use of multiple cameras. A clear undistorted field of view, with minimal double imaging and excellent MTF (Modulation Transfer Function, a measure of how well a lens maps an image to a sensor), is especially critical for camera based systems to perform as intended. It is essential for these systems to be able to quickly differentiate between objects, capture text, identify signage, and operate with minimal lighting. Further, as the resolution of the cameras used increases the need for a clear distortion free field of view increases.

While covers and various styling methods can be used to obscure the components and cables from the inside, we also need to maintain clean lines and a good aesthetic when the vehicle is viewed from the exterior.

Standard practice has been to extend the black enamel frit band, also called black band, to create an obscuration on the surface number four with openings in the obscuration to provide for the required camera field of view.

When the black band is extended downward from the top center black band to create an obscuration on the surface number two or surface number four, distortion and stress can become a major problem. This is because the black frit is extending further from the edge into the area that where more heat must be applied to bend the glass. The large surface area of the obscuration increases the probability of breakage due to the surface defects and stress introduced by the frit. This is also a critical viewing area.

A panoramic windshield is a windshield in which the top edge of glass has been extended to include at least a portion of the roof giving the driver an extended vertical field of view, as shown in FIG. 2. In the case of a panoramic windshield, the problem is even more pronounced as the black band obscuration 32, 8 extends several centimeters from the top edge and is located near the weakest point of the windshield. This is also where the highest temperatures are required to bend the glass which results in even higher thermal gradients and distortion.

One possible solution is to print the obscuration on the plastic bonding interlayer rather than on the glass. To date, the primary application for printed interlayers has been for architectural laminates, providing a means to produce vivid colors and patterns at 600 DPI that were never before possible. However, little has been done in the automotive market. One of the reasons is that screen print enamel frits provide a high degree of protection from UV which is needed to protect the polyurethane used to bond the glazing to the vehicle opening. Inks printed on the interlayer do not have the same level of opacity and UV blocking ability than the black enamel frits do.

Another reason is that interlayer printed inks do not provide the deep black glossy appearance of a fired black frit. This is due to the limited number of inks that are available for printing on interlayers.

In addition, the various interlayers in use are all thermo plastics with glass transition points in the room temperature range or lower. As such, the sheets are limp and difficult to work with. The sheets do not lend themselves well to the automated feed systems of typical printing equipment.

Another area where black printed frits presents challenges is solar control.

In response to the government regulatory requirements for increased automotive fuel economy, as well as the growing public awareness and demand for energy efficient environmentally friendly products, automotive original equipment manufacturers around the world, have been working to improve the energy efficiency of their vehicles.

One of the key elements of this strategy to improve efficiency has been solar control. By reducing the solar load on the vehicle, substantial improvements can be made in energy consumption, especially in warmer climates, by reducing the load on the air-conditioning unit and allowing operation of the vehicle with the windows closed, which improves aerodynamics. This is especially important for electric vehicles, where the improvement directly translates into an increase in the range of the vehicle.

Infrared (IR) absorbing and infrared reflecting glazing are the two primary technologies that are being used to improve solar control.

Infrared absorbing glass has a higher iron content than ordinary transparent glass giving it a greenish tint. Iron compounds in the glass absorb solar energy. By absorbing the energy before it enters the passenger compartment, the solar load on the vehicle is reduced. While infrared absorbing windows can be very effective in reducing the solar load, the glass will heat up and transfer some of the absorbed energy to the passenger compartment through convective transfer and radiation. The glass will get hotter than ordinary transparent glass.

A more efficient method is to reflect the energy back to the atmosphere before it can heat the glass or the interior of the cabin. This is done using various films and coatings that reflect in the infrared.

Infrared reflecting coatings include but are not limited to various metal/dielectric layered coatings applied primarily though Magnetron Sputtered Vacuum Deposition (MSVD) as well as others known in the art that are applied via pyrolytic, spray, controlled vapor deposition (CVD), spin, dip, roller and other methods.

The biggest problem, with respect to IR reflecting coating, is that coatings are not compatible with frits. The frit will damage the coating if the frit is printed after the glass has been coated. The frit must first be printed on the glass, fired and then coated. Very few manufacturers have this capability as it requires a large capital investment. Another drawback is that the black frit absorbs solar energy and can get very hot.

Another problem is applying obscurations to non sodalime glass.

Historically, windows have been made from standard soda-lime glass. This is the most common and economical formulation and accounts for a large percentage of the world's glass productions both for windows and containers. Other types of glass are known but have primarily been reserved for specialty applications. Increasingly, non-standard glass types are finding application in automotive glazing. There they are used to provide for thinner and lighter glazing. While many types of inks are available for printing on soda-lime glass, there are very few if any for non-soda lime glass due to differences in chemistry and processing.

Another key element of the strategy to improve efficiency has been the concept of light weighting. Often, more traditional, less expensive, conventional materials and processes are being replaced by innovative new materials and processes which while sometime being more expensive, still have higher utility than the materials and processes being replaced due to their lower weight and the corresponding increase in fuel efficiency. Sometimes, new materials and processes bring with them added functionality as well in addition to their lighter weight. Vehicle glazing has been no exception.

However, there are limits to get thin the glazing using annealed soda-lime glass. Stress under wind load has always been a factor. With the trend towards increasing the size of windshields, wind load is even more of a concern. Glass is also becoming a structural element in more and more vehicles. The glazing contributes to the stiffness and strength of the car. Fixed glass, once bonded with a relatively soft curing poly-urethane, is being mounted with higher modulus adhesives. As a result, the glass, once isolated by rubber gaskets and soft butyl adhesives, is now much more subject to loading from the bumps in the road and vehicle torsion.

Today, windshields with a 2.1 mm outer ply, a 1.6 mm inner ply and a 0.76 mm plastic bonding interlayer, totaling just under 4.5 mm in total thickness are becoming common. This may be close to the limit of what can be done with conventional annealed soda-lime glass. Increasingly, other non-standard types of glass are finding their way into automotive applications as the quest for thinner, lighter, more durable and stronger glazing continues.

The glass layers may be annealed or strengthened. There are two processes that can be used to increase the strength of glass. They are thermal strengthening, in which the hot glass is rapidly cooled (quenched) and chemical tempering, which achieves the same effect through an ion exchange chemical treatment.

In the chemical tempering process, ions in and near the outside surface of the glass are exchanged with ions that are larger. This places the outer layer of glass in compression. Compressive strengths of up to 1,000 MPa are possible. Typical methods involved submerging the glass in a tank of molten salt where the ion exchange takes place. Chemical tempering presents a challenge for glazing where an obscuration is needed. A black frit is typically printed directly onto the surface of the glass prior to the bending of the glass. However, to chemically temper, the glass surface must not have any paint or coatings that will interfere with the ion exchange process. Therefore, organic black inks are applied after bending and chemically tempering. This is a labor intense expensive process. Also, the organic inks are not as durable as their ceramic counterparts.

It would be advantageous to be able to produce an automotive laminate with an obscuration that does not have these drawbacks.

BRIEF DESCRIPTION OF THE INVENTION

The subject of the immediate invention is a laminated automotive glazing with a least one obscuration which is produced by creating the obscuration after heating and bending the glass by cutting a sheet of thin plastic to shape and inserting into the laminate, as the laminate layers are being assembled. Due to the thinness of the obscuration and composition, no compensation is needed to offset the change in thickness at the inboard edge of the obscuration.

Forming a obscuration integral to the laminate by inserting a sheet of thin plastic allows for the use of a coatings that are not compatible with frits, eliminates the need to use organic ink to paint after bending on chemically tempered glass and glass for which no frit is available, improves optical quality (lower reflected and transmitted distortion, an improved modulus transfer function and lower double image separation), provides aesthetics and performance comparable to fired black enamel frit with same glossy deep black appearance as the back frit, improves probability of breakage, does not require compensation for thickness and can be fabricated using standard automotive glass processes and equipment. In addition, laminates made in this manner are stronger and have superior optical quality, especially in the areas of the laminate used by cameras.

applying a thin substantially opaque insert to at least one of the surfaces of the plastic bonding layer, film or glass layers in or near the camera field of view (camera obscuration) or/and in the edges of the laminated glazing (black band). This as opposed to printing and firing an enamel frit onto the glass.

The insert may be fabricated of a thin substantially opaque plastic or other suitable material which is then adhered or placed in contact with at least one of the internal surfaces of the laminate including the glass surfaces, the plastic bonding interlayer surfaces or film surfaces. The insert may be fabricated by means of CNC cutting (LASER, blade or ultrasonic), die cutting or any other method known in the art that is suitable for the material selected. The thin insert can be added during the assembly of the laminate. An adhesion promoter, such as PVB dissolved in alcohol or a plasticizer may be required to meet safety glazing regulations. Surface of the insert that are not hidden may require the use of an optical adhesive. Application of the adhesive or adhesion promoter may be made by brush, spray, roller, pad or any other convenient suitable means. The insert may be comprised of more than one segment. The thickness of the insert will depend upon the materials and thicknesses of the laminate as well as the lamination processing parameters. In general, good results can be obtained with an insert thickness no greater than ⅓ of the total thickness of the plastic interlayer. Thinner is always easier to laminate.

ADVANTAGES

1. Best in class optics.
2. Frit induced surface defects are eliminated.
3. Residual stress caused by non-uniform heating of the frit is eliminated.
4. Residual stress caused surface mismatch due to the frit is eliminated.
5. Low distortion, comparable to ordinary clear glass.
6. Low double image, comparable to ordinary clear glass.
7. Lower probability of breakage.
8. Higher yield during bending due to elimination of non-uniform heating.
9. Higher yields during lamination due to higher strength, lower residual stress and less surface mismatch.

REFERENCE NUMERALS

Figure 1A:
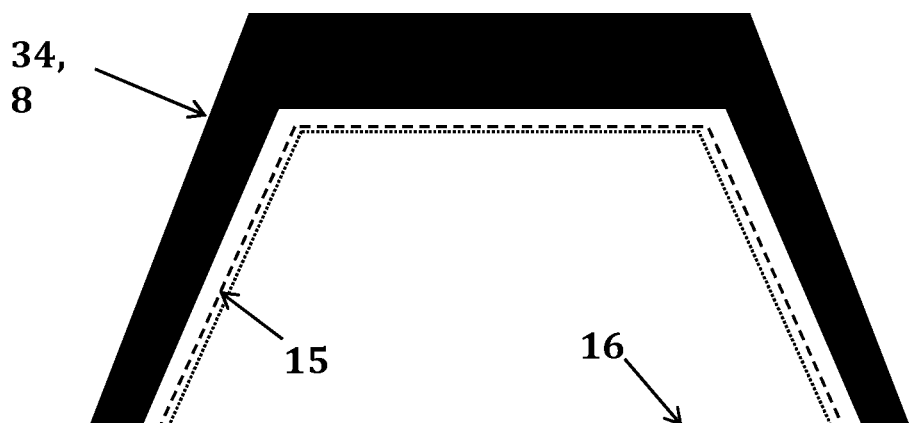
FIG. 1A shows a camera obscuration with "burn" line buffer.
Figure 1B:
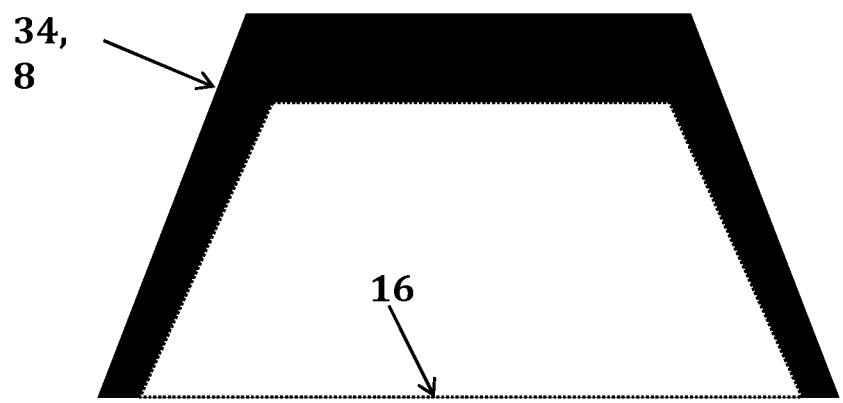
FIG. 1B shows a camera obscuration without burn line buffer.
Figure 2:
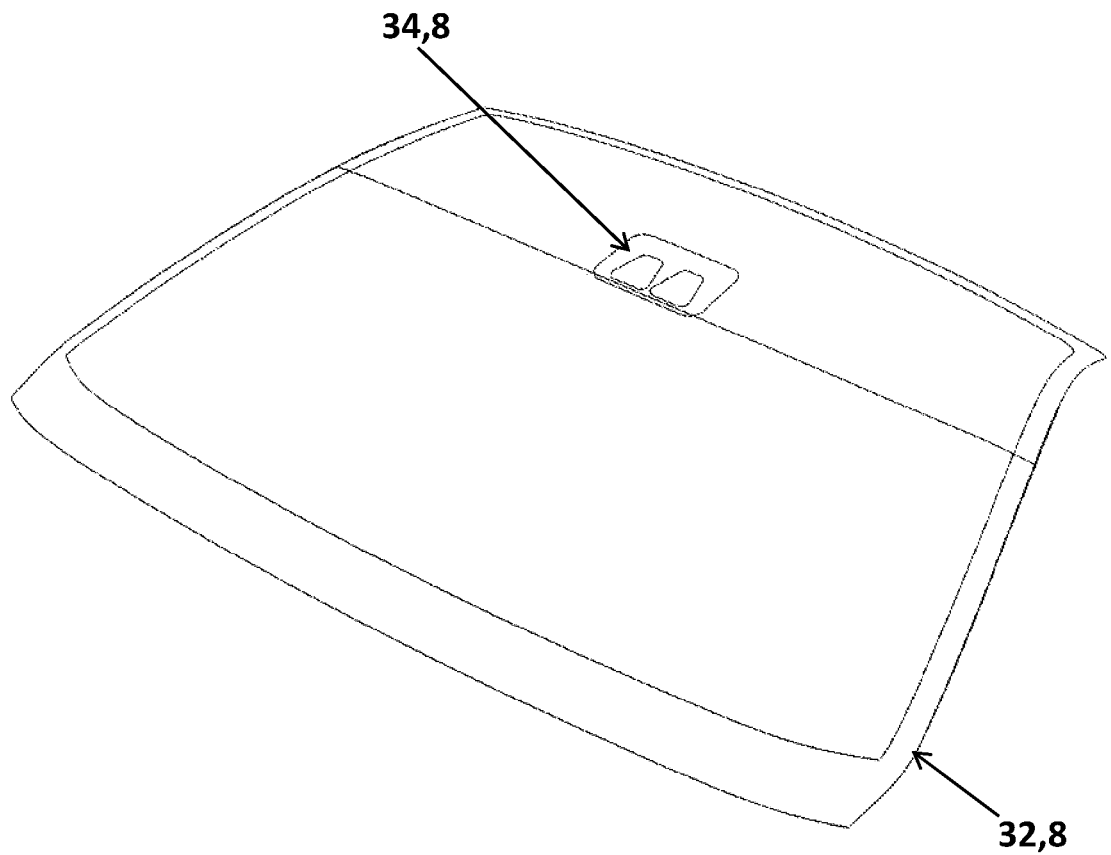
FIG. 2 shows an isometric view of panoramic windshield with camera obscuration and black band.

3 Wedge Plastic Interlayer
4 Plastic Interlayer
8 Obscuration (Insert, Printed, Inlay)
10 Cutout
15 Buffer
16 Field of view
17 Film
30 Openings in Camera Obscuration
32 Black Band Obscuration
40 Double image Angle
41 Observation point
42 Incident ray from image
43 Primary image
44 Secondary image
45 Wedge angle
46 Incident angle
48 Refracted ray
50 Surface normal
52 Angle of deviation
56 Inclination angle
101 First Surface of Glass
102 Second Surface of Glass
103 Third Surface of Glass
104 Fourth Surface of Glass
201 Outer glass layer
202 Inner glass layer
16 Non-plasticized polyvinyl butyral NPPVB
18 IR Reflecting Coating
24 IR Reflecting Film
34 Bus bar
44 Switchable Film

DETAILED DESCRIPTION OF THE INVENTION

The invention eliminates the drawbacks associated with the fired black frit obscurations of the prior art by using the alternate method of the invention to provide the obscuration for at least a portion of the laminated glazing, such as the camera field of view (camera obscuration) or/and the edges of the laminated glazing (black band), after the glass has been heated and bent to shape. By not applying the black frit to the glass during the bending process allows for a more uniform heat distribution across the part which reduces residual stresses and the associated surface mismatch, warping and distortion caused by the thermal gradients.

Figures 3A, 3B:
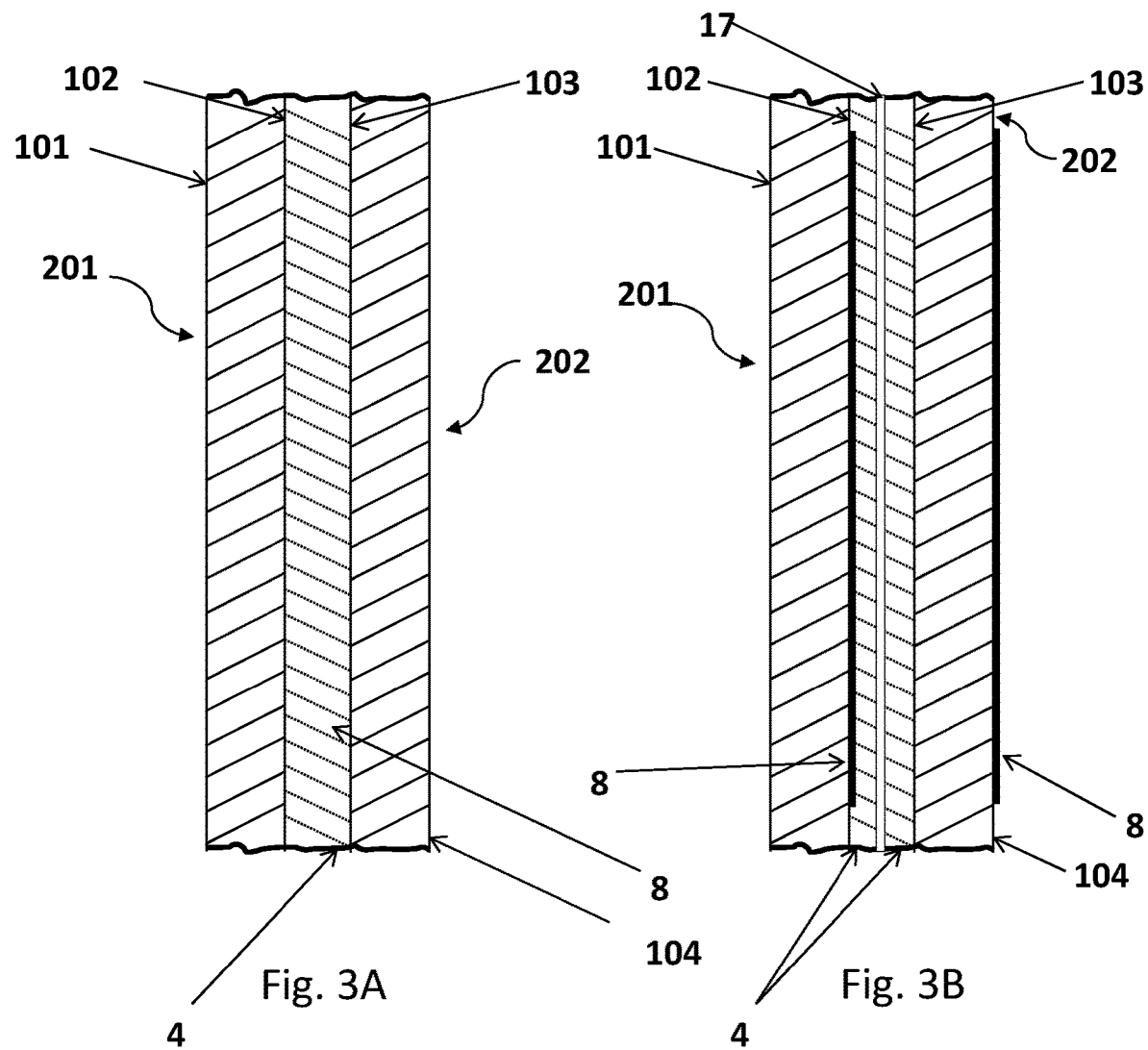
FIG. 3A shows a cross section of laminate with single plastic layer and inlay camera obscuration.
FIG. 3B shows a cross section of laminate with two plastic layers with film layer with inlay camera obscuration in outboard plastic layer.

In the drawings and discussion, the following terminology is used to describe the configuration of a laminated glazing. Typical automotive laminated glazing cross sections are illustrated in FIGS. 3A and 3B. A laminate is comprised of two layers of glass, the exterior or outer 201 and interior or inner 202 that are permanently bonded together by a plastic interlayer 4. The exterior glass surface that is on the outer glass layer 201 is referred to as surface number one 101 or the number one surface. The opposite face of the same glass layer is surface number two 102 or the number two surface. The interior glass surface that is on the inner glass layer 202 is referred to as surface number four 104 or the number four surface. The opposite face of same glass layer is surface number three 103 or the number three surface. Surfaces two 102 and three 103 are bonded together by the plastic bonding interlayer 4.

Laminated safety glass is made by bonding two sheets (201 & 202) of annealed glass 2 together using a thin sheet of a transparent thermo plastic bonding interlayer 4. Annealed glass is glass that has been slowly cooled from the bending temperature down through the glass transition range. This process relieves any stress left in the glass from the bending process. Annealed glass breaks into large shards with sharp edges. When laminated glass breaks, the shards of broken glass are held together, much like the pieces of a jigsaw puzzle, by the plastic layer helping to maintain the structural integrity of the glass. A vehicle with a broken windshield can still be operated. The plastic bonding interlayer 4 also helps to prevent penetration by objects striking the laminate from the exterior and in the event of a crash occupant retention is improved.

The plastic bonding interlayer has the primary function of bonding the major faces of adjacent layers to each other. The material selected is typically a clear plastic. For automotive use, the most commonly used bonding interlayer is polyvinyl butyl (PVB). PVB has excellent adhesion to glass and is optically clear once laminated. It is produced by the reaction between polyvinyl alcohol and n-butyraldehyde. PVB is clear and has high adhesion to glass. However, PVB is too brittle. Plasticizers must be added to make the material flexible and to provide the ability to dissipate energy over a wide range over the temperature range required for an automobile. Only a small number of plasticizers are used. They are typically linear dicarboxylic esters. Two in common use are di-n-hexyl adipate and tetra-ethyleneglycol di-n-heptanoate. A typical automotive PVB interlayer is comprised of 30-40% plasticizer by weight.

In addition to polyvinyl butyl, ionoplast polymers, ethylene vinyl acetate (EVA), cast in place (CIP) liquid resin and thermoplastic polyurethane (TPU) can also be used. Automotive interlayers are made by extrusion process with thickness tolerance and process variation. As a smooth surface tends to stick to the glass, it is difficult to position it on the glass and to trap air. To facilitate the handling of the plastic sheet and the removal or air (deairing) from the laminate, the surface of the plastic is normally embossed, contributing additional variation to the sheet. Standard thicknesses for automotive PVB interlayer are between 0.38 mm and 0.76 mm (15 and 30 mil). Automotive interlayers are made through extrusion process.

Interlayers are available in a wide range of colors ranging in transparency from transparent to substantially opaque.

While plasticized PVB sheets are limp at room temperature, non-plasticized PVB is stiff. Non-plasticized PVB can be produced in sheets as thin as 10 µm.

As a general rule of thumb, a film, busbar, sensor, wire, lead or other objects can be laminated if the thickness is not more than ⅓ of the total thickness of the interlayer. The interlayer is soft at room temperature. During the lamination process, the interlayer is treated at high temperature and will flow to accommodate onto the added object. The maximum thickness will depend upon other factors such as the dimensions of the object, the thickness of the glass, the strength of the glass, the specific interlayer and the time, temperature and pressure of the lamination cycle. If the object is too thick, the glass may break. Objectionable distortion can also occur. With all other factors remaining the same, thinner is always better with respect to the risk of breakage and distortion.

In a preferred embodiment, the obscuration of the invention is produced by cutting a thin sheet of black opaque non-plasticized PVB to the desired shape and then inserting the cut sheet into the laminate. The non-plasticized PVB (NPPVB) has excellent adhesion to both the glass and the normal PVB interlayer, as well as all of the common performance films such as IR reflecting and switchable found in the market. The PVB and the non-plasticized PVB will become viscous and flow under the heat and pressure of the lamination process allowing for even more compliance than with other materials such as PET which do not flow. Some of the plasticizer from the normal PVB migrates to the non-plasticized PVB further enhancing the properties. A laminate made by this process will pass all government and industry homologation tests, the same as a standard laminate. In fact, the laminate of the invention is stronger since no fired black frit is used, although some embodiments may use a non-plasticized PVB obscuration in conjunction with a standard printed black frit, when convenient as illustrated in the examples. Optics in the area adjacent to the obscuration are remarkably improved over those of a printed and fired black frit, due to the absence of the burn line distortion and residual stress.

The non-plasticized PVB sheets can be cut using the same means used for normal PVB. Typically, PVB is either die cut or CNC cut. Several sheets may be cut at the same time. The stiffness of the material facilitates handling. While the scrap rate may be high, all of the scarp can be recycled and eventually used. Given the thinness of non-plasticized PVB, nothing is needed to compensate for the change in thickness of the layer. The thickness of the non-plasticized PVB is no more than one third of the total thickness of the layer separating the glass layers. Generally, a sheet with a thickness of less than or equal to about 70 µm will be used, preferably less than or equal to about 50 µm and preferably less than or equal to about 20 µm. Thinness is always better as far as lamination is concerned. It should be noted that the thickness of the fired black frit is in the range of 10-20 µm.

If needed, the NPPVB black band obscuration and the standard interlayer (plastic bonding layer), may be bonded to each other through the use of heat or a solvent. This may be done if the interlayer/obscuration sheet are to be assembled before the assembly of the laminate. Otherwise, they are assembled together in the normal manner during the step in which the standard interlayer is placed between the two bent glass layers during the assembly portion of the lamination process.

As the NPPVB has excellent adhesion to glass when laminated in contact with normal PVB, the obscuration is positioned in the laminate next to any of the interior glass surface 102, 103.

The potential embodiments of the invention include, but are not limited, to a NPPVB plastic. Other plastics that can serve the same function may be substituted, including a partially plasticized PVB and others which have comparable durability, transparency, clarity and adhesion to the various automotive laminate substrates as needed, without departing from the concept of the invention. An elongation stress can be applied to some plastics so that a stretched plastic which does not require compensation for thickness is obtained.

Interlayers are available with enhanced capabilities beyond bonding the glass layers together. The invention may include interlayers designed to dampen sound. Such interlayers are comprised whole or in part of a layer of plastic that is softer and more flexible than that normally used. The interlayer may also be of a type which has solar attenuating properties.

The types of glass that may be used include but are not limited to: the common soda-lime variety typical of automotive glazing as well as aluminosilicate, lithium aluminosilicate, borosilicate, glass ceramics, and the various other inorganic solid amorphous compositions which undergo a glass transition and are classified as glass included those that are not transparent.

The glass layers may be annealed or strengthened. There are two processes that can be used to increase the strength of glass. They are thermal strengthening, in which the hot glass is rapidly cooled (quenched) and chemical tempering which achieves the same effect through an ion exchange chemical treatment. In the chemical tempering process, ions in and near the outside surface of the glass are exchanged with ions that are larger. This places the outer layer of glass in compression. Compressive strengths of up to 1,000 Mpa are possible.

The glass layers are formed using gravity bending, press bending, cold bending or any other conventional means known in the art. Bending methods for forming glass are well known in the art and will not be discussed in the present disclosure.

One of the big advantages of a laminated window over a tempered monolithic window is that a laminate can make use of infrared reflecting coatings and infrared reflecting films in addition to heat absorbing compositions.

Infrared reflecting coatings include but are not limited to the various metal/dielectric layered coatings applied though Magnetron Sputtered Vacuum Deposition (MSVD) as well as others known in the art that are applied via pyrolytic, spray, controlled vapor deposition (CVD), dip and other methods.

Infrared reflecting films include both metallic coated substrates as well as organic based optical films which reflect in the infrared.

A heat absorbing window can be very effective but the glass gets hot and transfers energy to the passenger compartment through convective transfer and radiation whereas the infrared reflecting coatings and films reflect the heat back to the atmosphere allowing the glass so stay cooler.

In addition to the metallic and non-metallic films that reflect in the infra-red, a wide variety of other films are available for use in laminates to add capability and enhance other properties. To control light transmission there are available: electro chromic, photochromic, thermochromic and field effect films which are designed to be incorporated into laminates. Of particular interest are suspended particle devices (SPD) and polymer dispensed liquid crystal (PDLC) films which can quickly change state under the control of an electrical field. These films will be collectively referred to as performance films.

Film, as used in this document shall refer to single ply/layer compositions as well as films comprised of multiple layers. A common plastic used in such films is PET (polyethylene terephthalate) but as can be appreciated can be of any other composition found to be suitable can be used. Some examples include but are not limited to: metal based heat reflecting films, non-metal based heat reflecting films, tint films, and heat absorbing films, Suspended Particle Device (SPD) films, Polymer Dispersed Liquid Chrystal (PDLC) films, conductive coated films, and ordinary PET.

Figure 4:
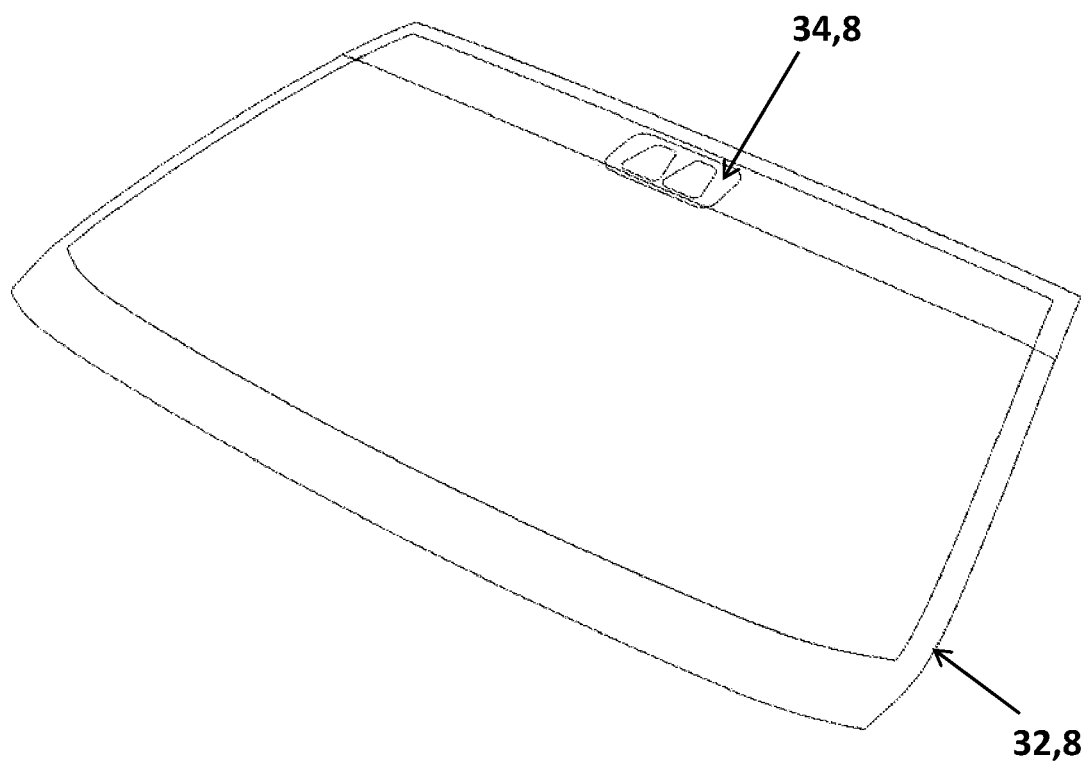
FIG. 4 shows an isometric view of windshield with gap between the camera obscuration and the black band.
Figure 5A:
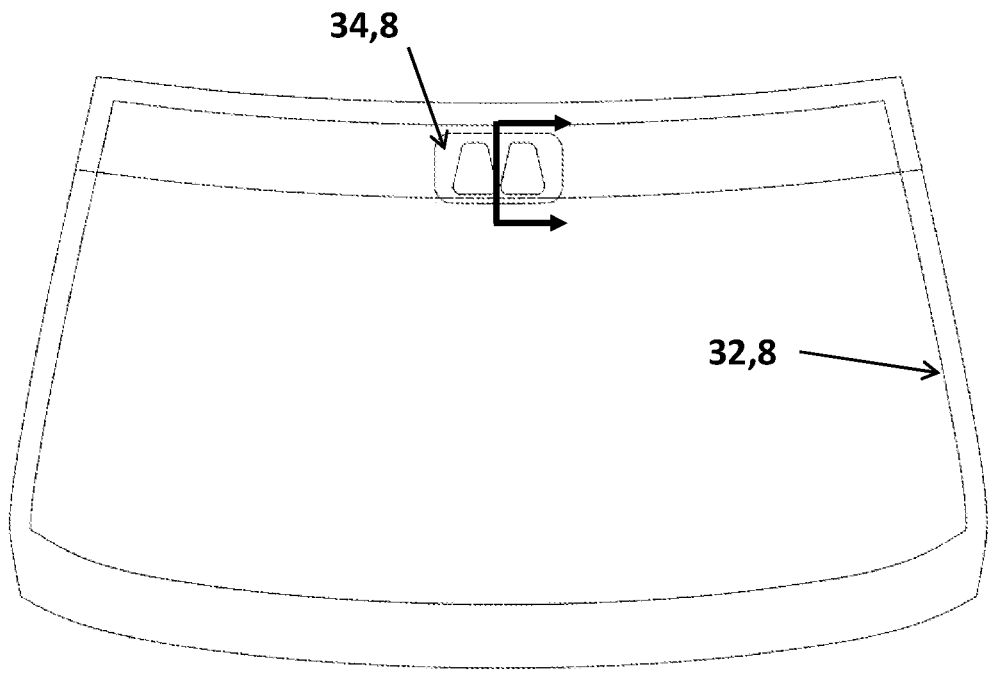
FIG. 5A shows a front view of windshield with gap between the camera obscuration and the black band.
Figure 5B:
FIG. 5B shows a camera obscuration detail showing black and clear portions.

If a combination of frit and the method of the invention are used for the obscuration 8, the black band 32 and the Camera obscuration 34, any difference in the appearance between the two may be noticeable. In that case, separating the Camera obscuration 34 from the black band 32, as shown in FIGS. 4 and 5, will improve the aesthetic.

In the obscuration areas where the invention is applied, all of the detrimental effects of the black enamel frit on the glass are eliminated resulting in superior optical quality, lower stress, and a lower probability of breakage.

In addition to the benefits to the finished laminate, the elimination of the non-uniform heating and high thermal gradient present in the black frit areas increases yields through the bending process and also, due to the higher strength and lower surface mismatch, increases yields through the lamination process.

Distortion in windshields is measured in terms of refractive power. Refractive power is the change in the angular deviation along over distance. At a high enough level, it can result in noticeable optical distortion. The refractive power is expressed in diopters.

$$D_\varepsilon = \frac{d\alpha_\varepsilon}{dx} \frac{1}{\cos\varepsilon} \quad (1)$$

Where:
$\varepsilon$: angle formed between the incident ray of light and a line perpendicular to the surface normal of the glazing
$\alpha_\varepsilon$: angular deviation
$D_\varepsilon$: refractive power Most large windshield production lines utilize online automated inspection system which scan the glass and produce a contour map showing the optical distortion in diopters.

Laminates produced by this invention have significantly lower distortion in the areas near the obscurations as compared to the same and similar laminates produced with screen print black frit.

Figure 6A:
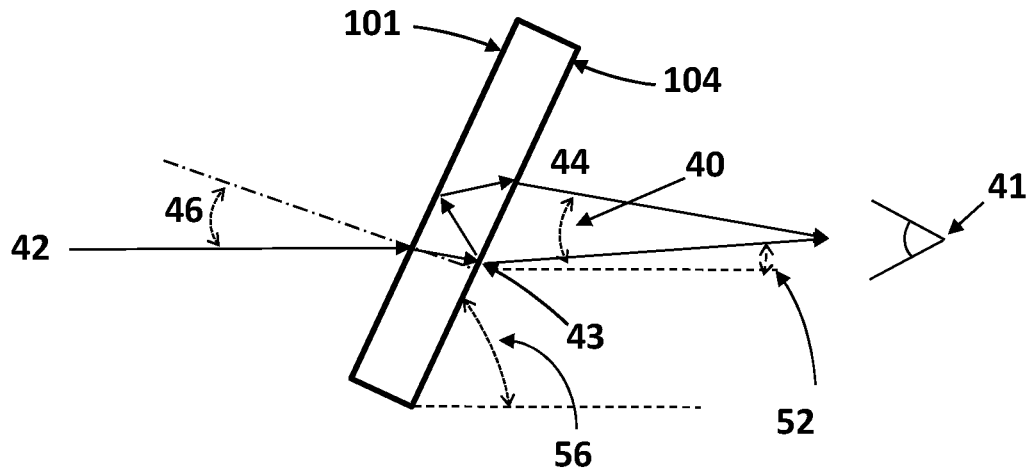
FIG. 6A shows a double image without correction.
Figure 6B:
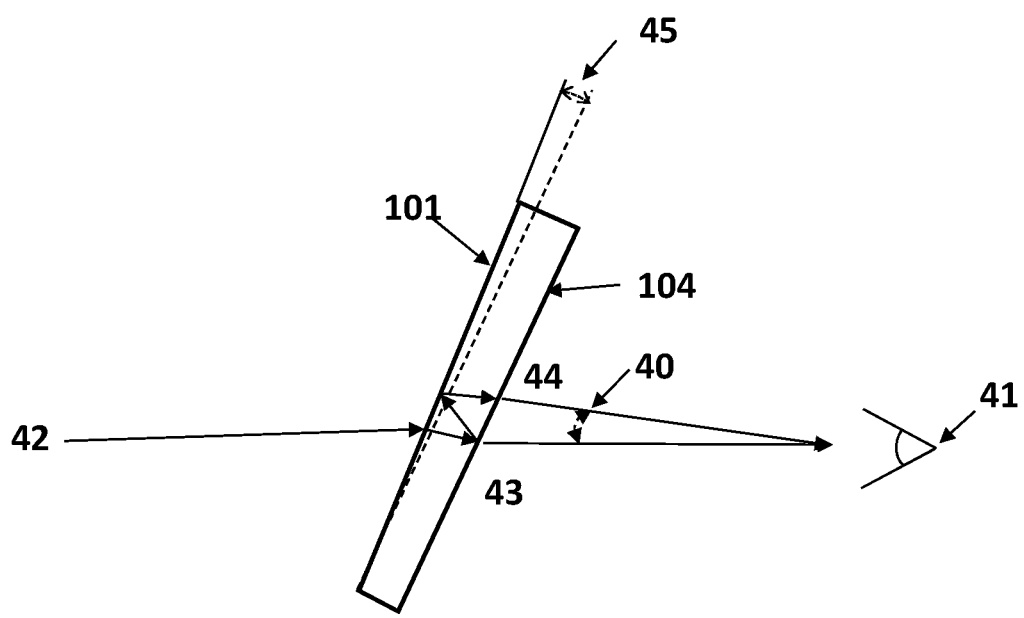
FIG. 6B shows a double image with wedge/shaped interlayer correction.

Double image, another problem of the prior art, is illustrated in FIGS. 6A and 6B.

An incident ray 42 of light enters the surface of the glass at an incident angle 46 and passes through the glazing to the observation point 41. The light bends (refracts) as it passes through the glazing. The angle by which the light bends is known as the angle of deviation 52. This refraction of the light causes a shifting of the primary image 43 of the object observed.

Some of the light from the incident ray 42 entering the glass is reflected back from the inside surface (surface number four 104 of the glass) and exits the glazing. A portion of the reflected light is again reflected back from outside surface (surface number one 101 of the glass) resulting in a double image. The double image angle $\eta$ 40 is the angle between the primary image 43 and secondary image 44 and the observation point 41. If the primary and secondary images are coincident, then the separation angle is zero. Regulatory requirements limit the separation angle to 15 minutes of arc for vision zone A (as defined by United Nations Regulation 42, revision 3) and 25 minutes of arc for vision zone B. However, it is well known that the maximum amount of double imaging imperceptible for the human eye is 7 minutes of arc.

The double image angle, $\eta$ 40, is calculated as shown in equation 2. It increases with decreasing angle of inclination 56, increasing curvature of the glass surface (surface number four 104) and with increasing size of the glazing. The double image angle, $\eta$ 40, can be reduced by altering the angle between the plies of glass as shown in FIGS. 7B and 7C. Normally, the glass surfaces are substantially parallel to each other. By creating a wedge angle 45 between the surfaces, the primary and secondary images can be shifted towards convergence.

$$\eta = \frac{2t\sin(\varepsilon)}{R\sqrt{n^2 - \sin(\varepsilon)^2}} \quad (2)$$

where:
$\eta$: double image angle
t: thickness of the glazing
n: refractive index
R: radius of curvature The angle between the plies of glass is adjusted through the use of an interlayer that has a non-uniform thickness, typically tapering from a thickness greater than the standard 0.76 mm at or near the top of the glazing a lesser thickness at the bottom. Such interlayers are produced through extrusion of the plastic. Such interlayers are known as "wedge" interlayers. They can also be formed, to a lesser extent by shaping (stretching) of the interlayer. Shaping is typically done to create a curved sunshade 6. Table 1 shows the wedge angle and reduction in thickness for a standard 0.76 mm thick interlayer over 1 meter as a function of sunshade radius.

It should be noted that wedge interlayer can be shaped to increase the wedge angle. Any combination of wedge and shaped interlayer can be used to obtain the desired results.

Figure 7A:
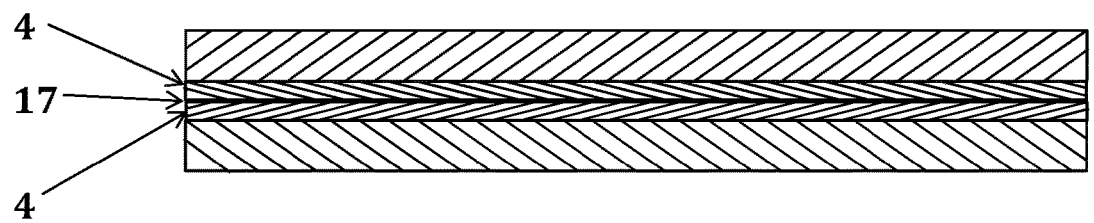
FIG. 7A shows a laminate with ordinary plastic interlayer.
Figure 7B:
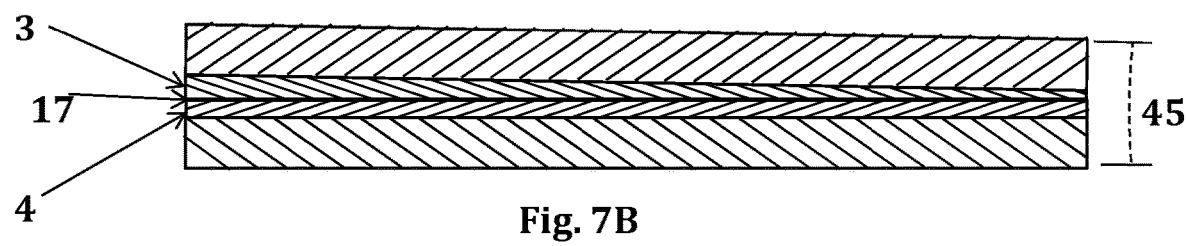
FIG. 7B shows a laminate with one ordinary plastic interlayer and one wedge/shaped plastic interlayer.
Figure 7C:
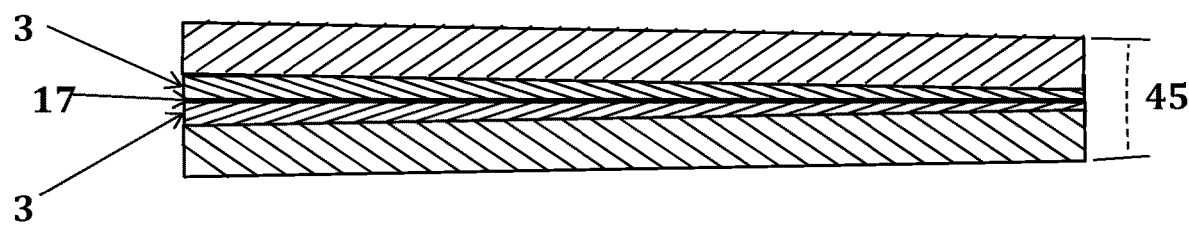
FIG. 7C shows a laminate with two wedge/shaped plastic interlayers.
Figure 8:
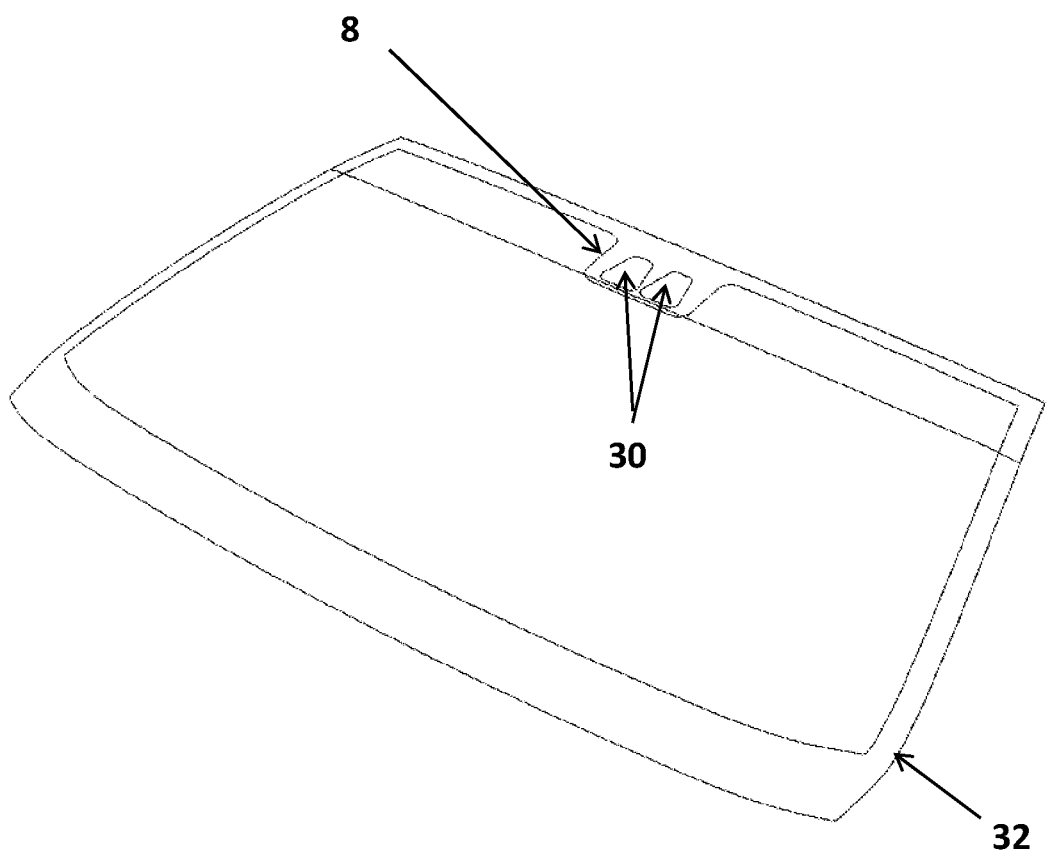
FIG. 8 shows an isometric view of windshield with camera obscuration that overlaps the black band FIG. 9 Exploded view of a windshield comprising a NPPVB obscuration.
Figure 9:
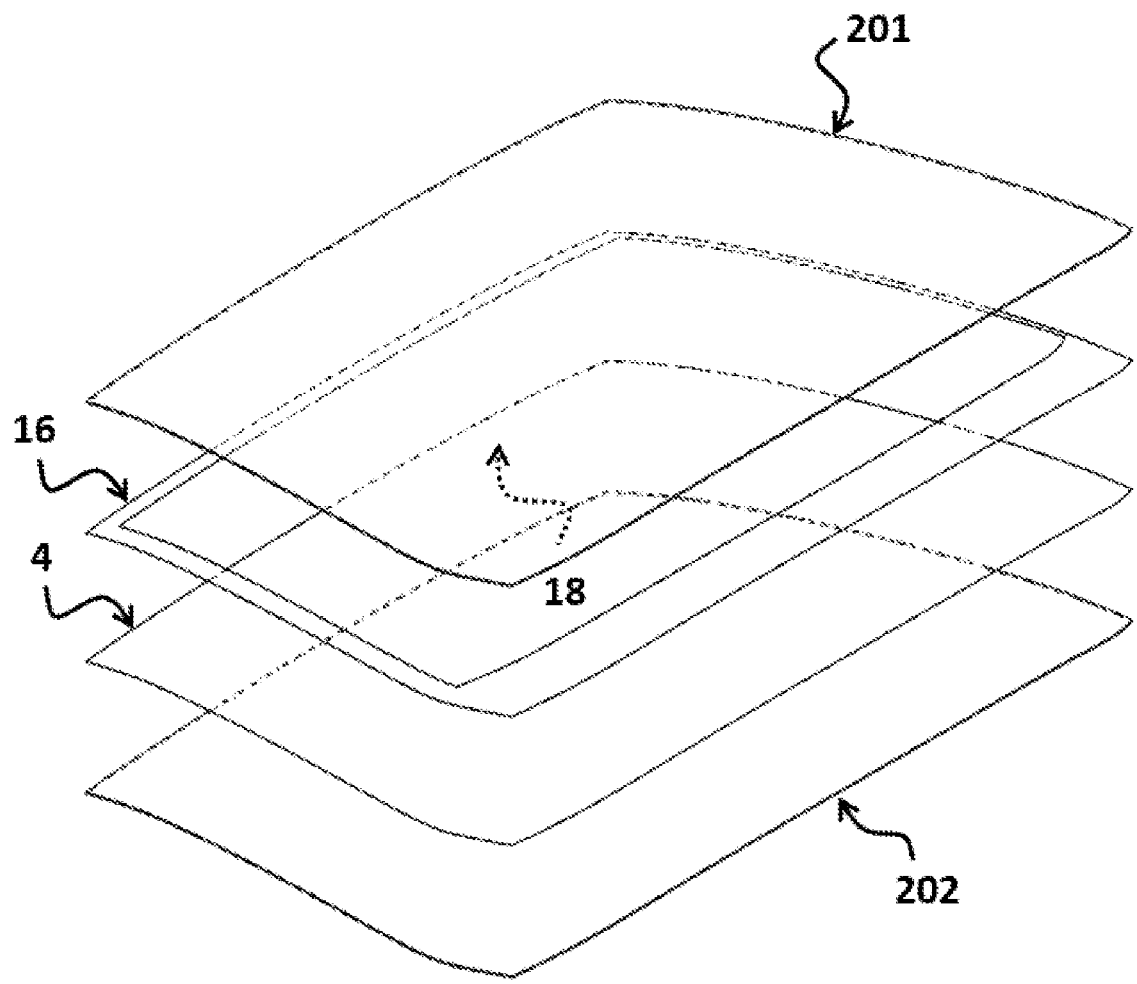
Figure 10:
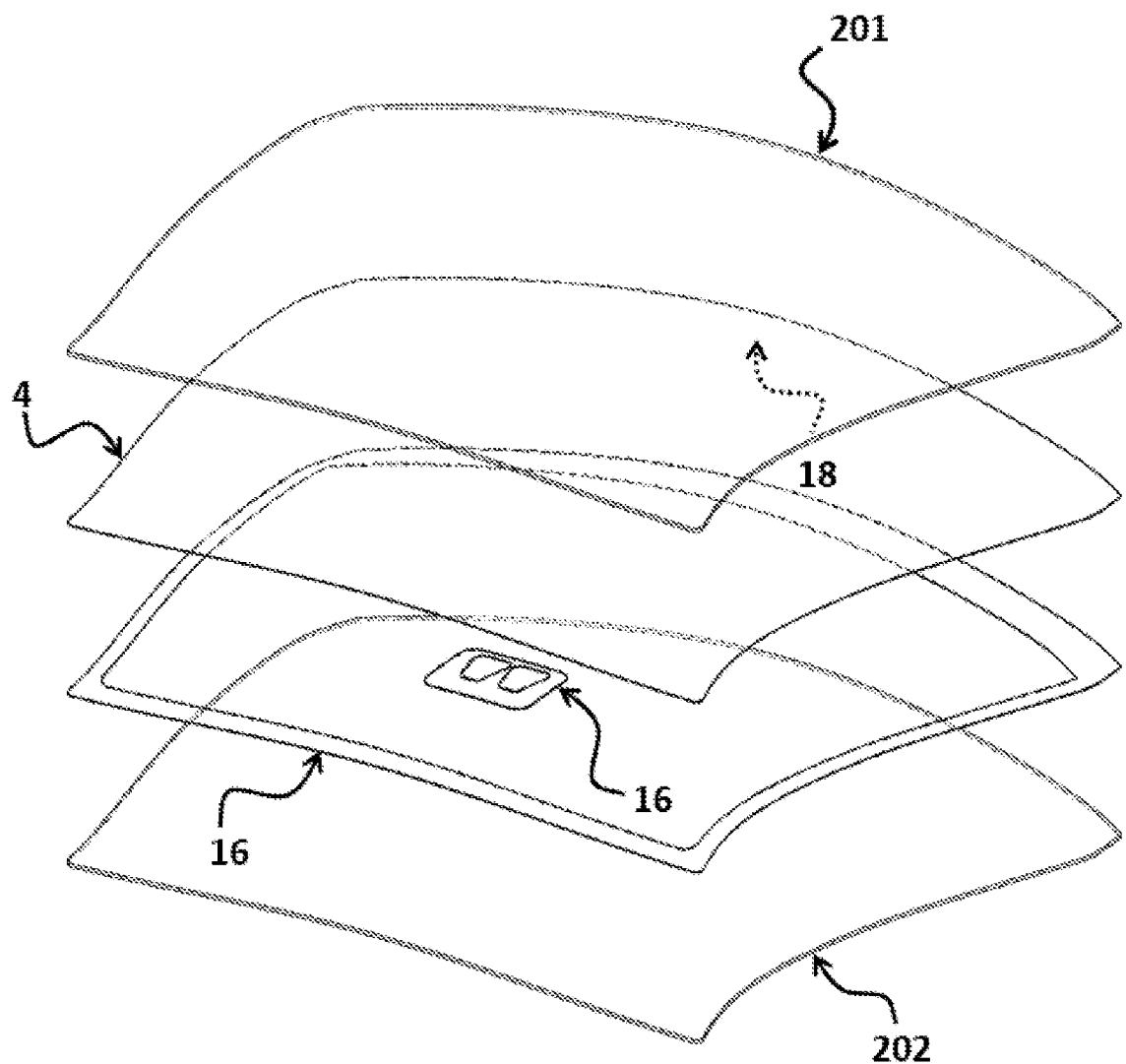
FIG. 10 Exploded view of a panoramic windshield comprising a NPPVB obscuration around the periphery and an additional separate NPPVB obscuration for the camera area.
Figure 11:
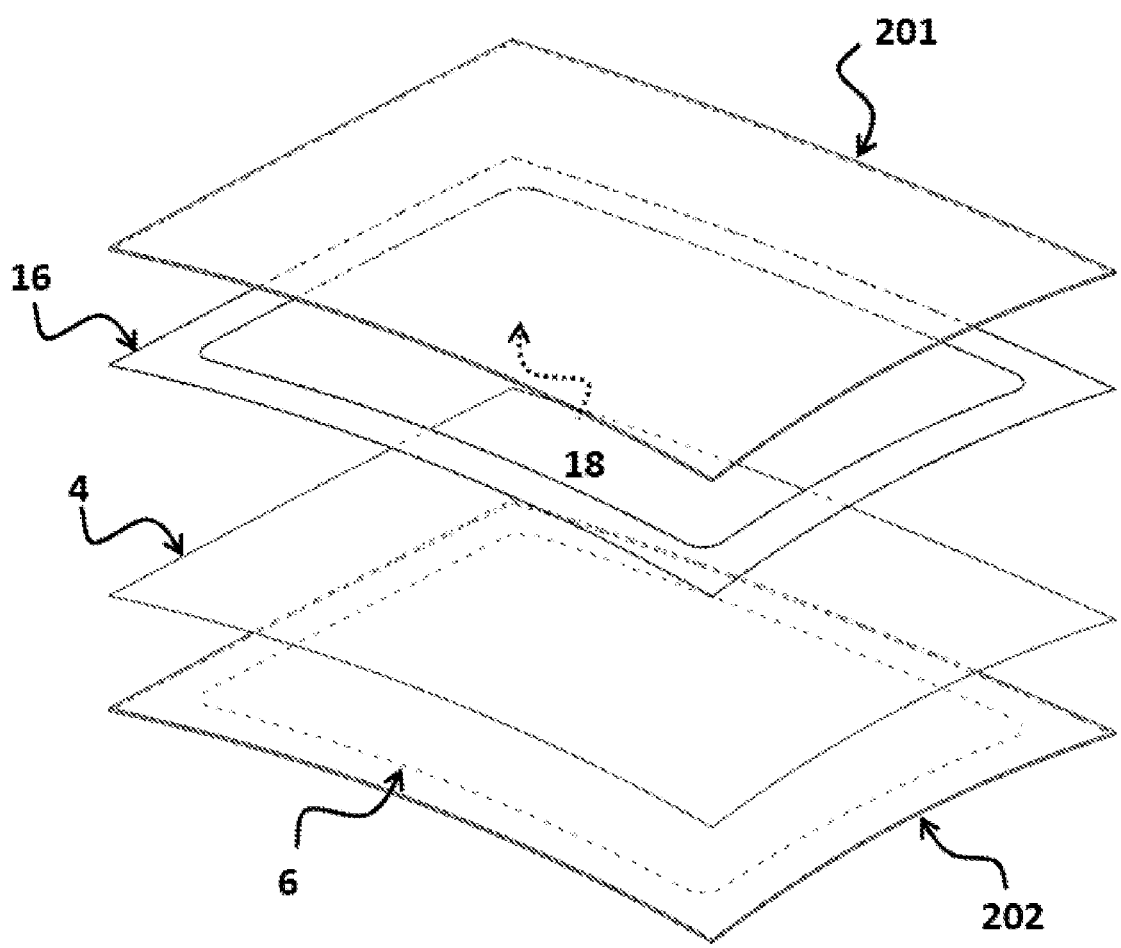
FIG. 11 Exploded view of a panoramic roof comprising a NPPVB obscuration.
Figure 12:
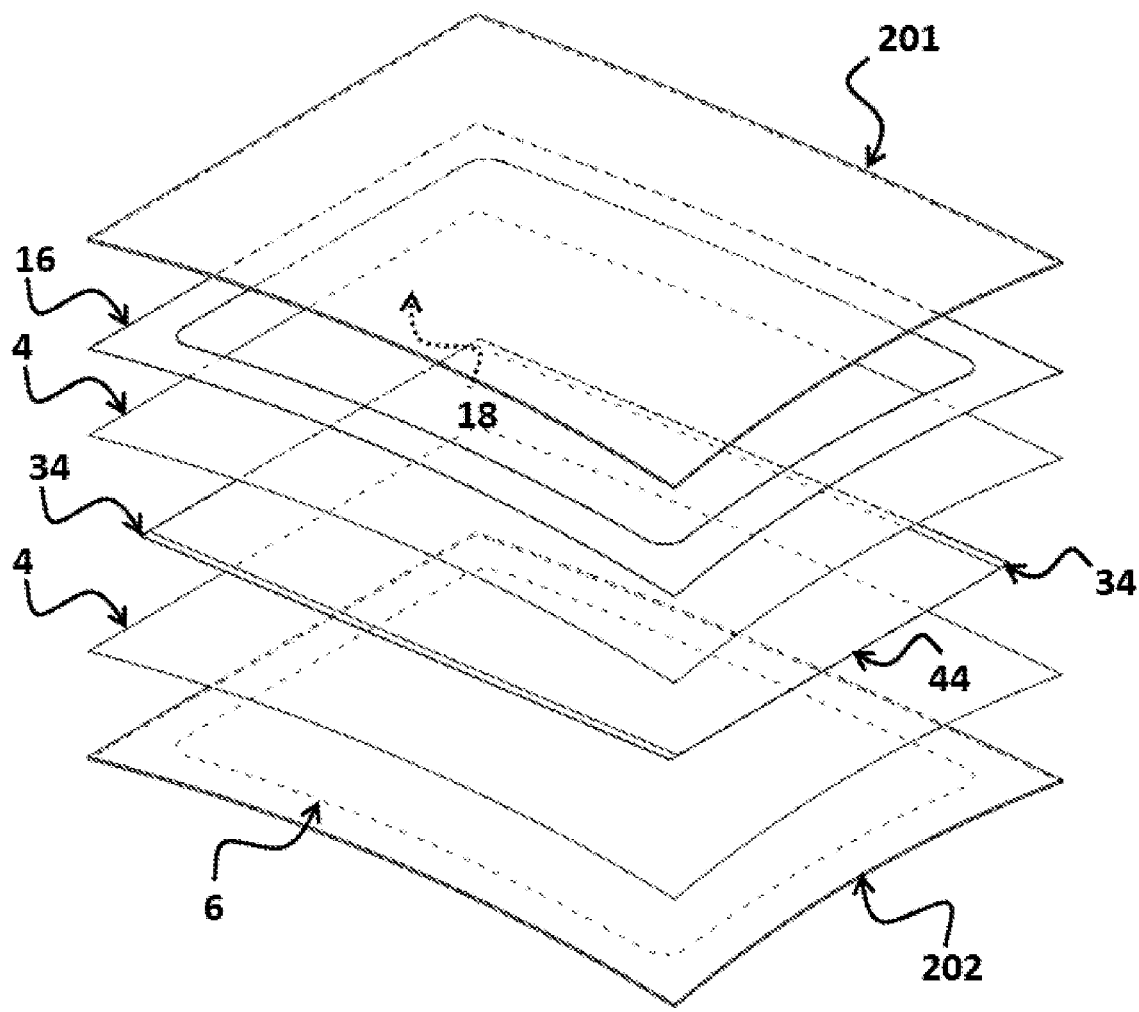
FIG. 12 Exploded view of a panoramic roof comprising a NPPVB obscuration concealing the edges of and busbars of a sheet of variable light transmittance switchable film from the exterior of the vehicle.
Figure 13:
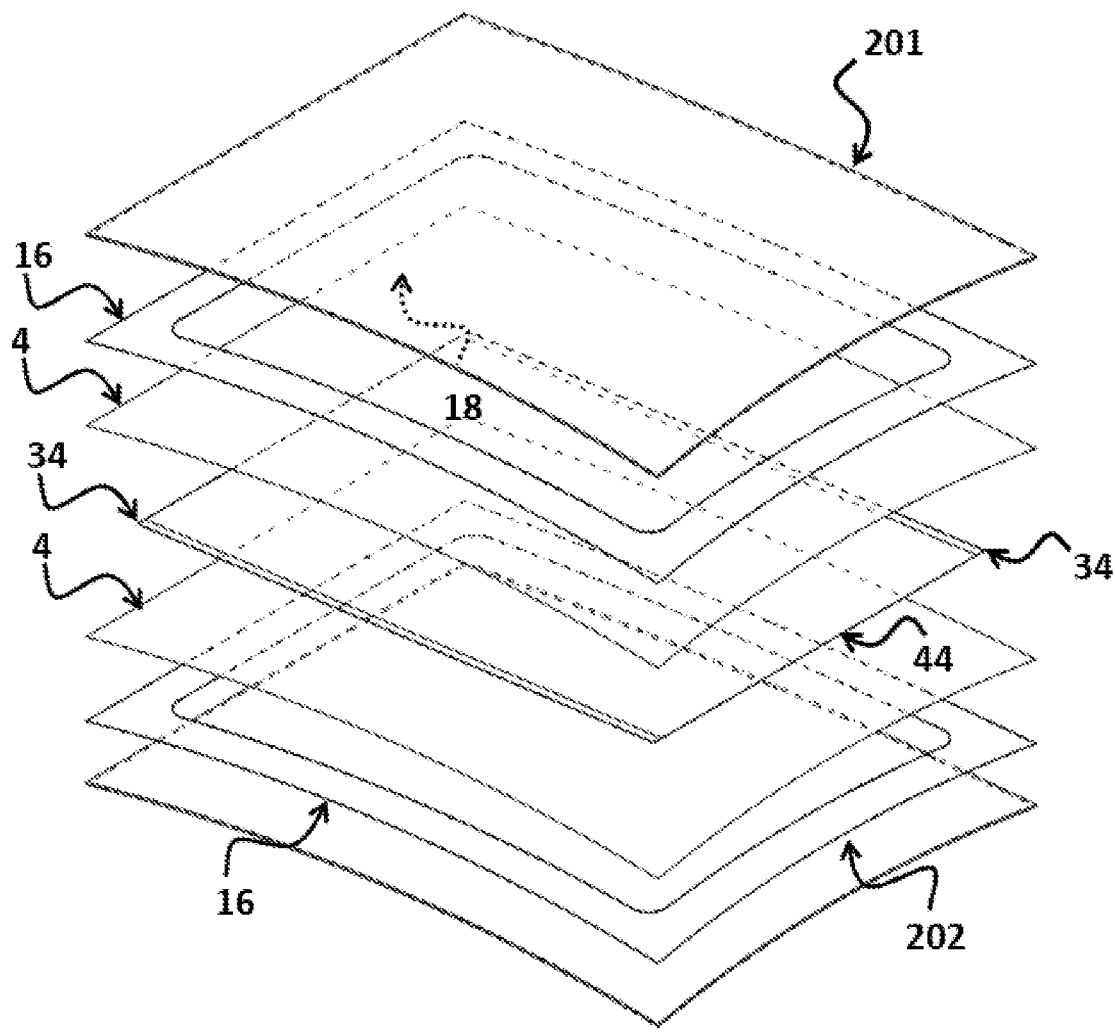
FIG. 13 Exploded view of a panoramic roof comprising a NPPVB obscuration concealing the edges of and busbars of a sheet of variable light transmittance switchable film from the exterior of the vehicle and a second NPPVB obscuration concealing the same from the interior of the vehicle.
Figure 14A:
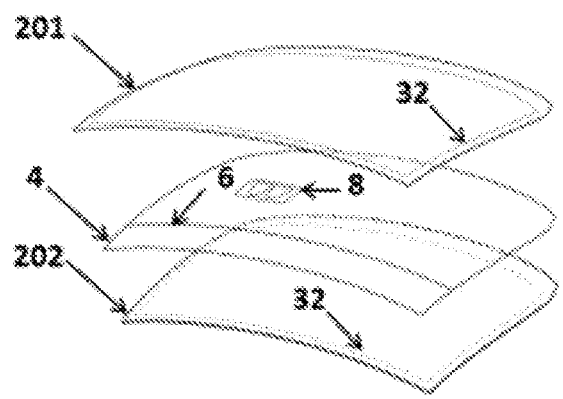
FIG. 14A Exploded view of windshield with thin insert camera obscuration on surface #3
Figure 14B:
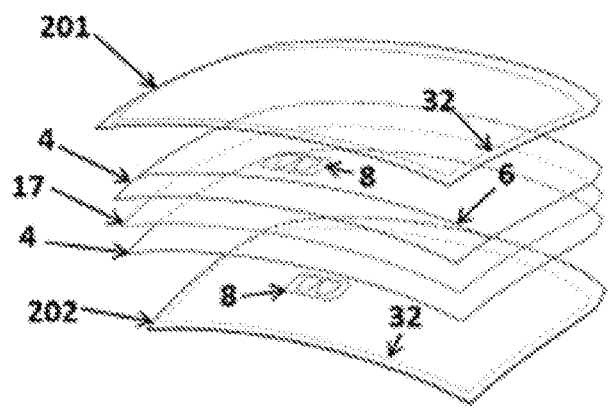
FIG. 14B Exploded view of windshield with two plastic layers and a PET film layer with thin insert camera obscurations on #2 and #3 surfaces FIG. 15A Cross section of laminate with single plastic layer and thin insert camera obscuration on the #2 surface.
Figures 15A, 15B:
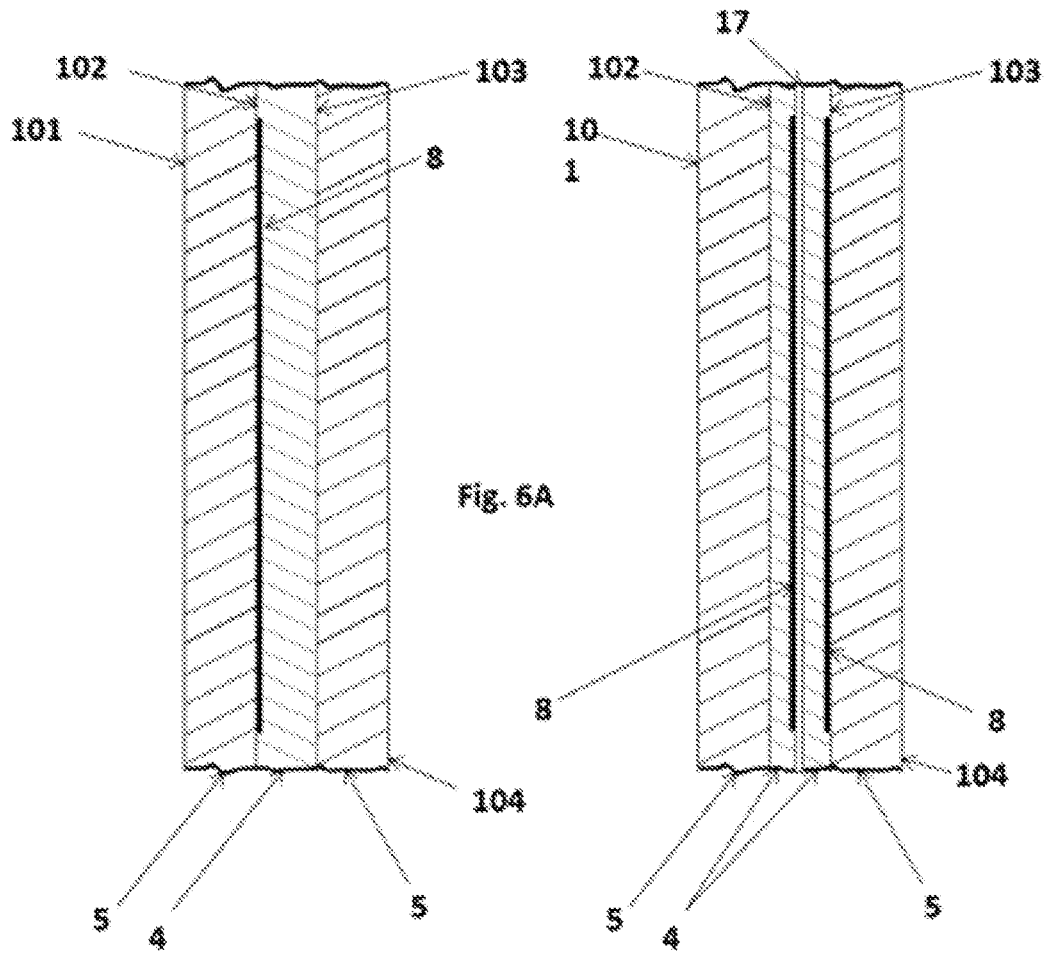
FIG. 15B Cross section of laminate with two plastic layers and a PET film layer with thin insert camera obscuration on outboard side of PET film layer and on the #3 surface.

FIG. 7A shows a laminate with two standard interlayers (plastic bonding interlayer 4). FIG. 7B shows a laminate with one wedge interlayer 3 and one standard interlayer with a film between them. FIG. 7C shows a laminate with two wedge interlayers. Wedge interlayer 3 can be used to further reduce double vision.

TABLE 1

Sunshade Radius vs. Wedge Angle

| Sunshade Radius m | Interlayer Thickness mm | Wedge Angle mrad |
|---|---|---|
| 2.0000 | 0.5067 | 0.253 |
| 2.5000 | 0.5429 | 0.1017 |
| 3.0000 | 0.5700 | 0.190 |
| 3.5000 | 0.5911 | 0.169 |
| 4.0000 | 0.6080 | 0.152 |
| 4.5000 | 0.61018 | 0.138 |
| 5.0000 | 0.6333 | 0.127 |
| 5.5000 | 0.6431 | 0.117 |
| 6.0000 | 0.6514 | 0.109 |
| 6.5000 | 0.6587 | 0.101 |
| 7.0000 | 0.6650 | 0.095 |
| 7.5000 | 0.6706 | 0.089 |
| 8.0000 | 0.6756 | 0.084 |
| 8.5000 | 0.6800 | 0.080 |
| 9.0000 | 0.6840 | 0.076 |
| 9.5000 | 0.6876 | 0.072 |
| 10.0000 | 0.6909 | 0.069 |

Experimental results have demonstrated the remarkable and unexpected magnitude of improvement of the invention. Fracture strength is more than doubled, MTF is drastically improved (see Graph 1), distortion is reduced by a factor of six and double image if reduced from 15" to 3". One should also note that all four of these parameters are critical to the operation of a safety camera.

TABLE 2

| | Laminate with Black Frit | Laminate with Obscuration Printed on Film |
|---|---|---|
| Fracture Strength (ring-on-ring) | 60 Mpa | 115 Mpa |
| Distortion (Camera window - 5 mm from the black edge) | 150 millidiopters | 25 millidiopters |
| Double image (Camera window - 5 mm from the black edge) | 15" (arc minute) | 3" (arc minute) |

As camera system for cars improve and the development of advanced driving assisted systems the vehicles windshield becomes an important component of the complex lens system that makes up the vehicle vision system. Our interest is due to our windshield serves as a lens in front of the camera, comprising one component of a complex lens system. The best way to evaluate this system is by measuring the MTF.

Modulation Transfer Function or "MTF" is the most widely used scientific method of describing lens performance. The modulation transfer function is, a measure of the transfer of modulation (or contrast) from the subject to the image. In other words, it measures how faithfully a lens reproduces (or transfers) detail from the object to the image produced by a lens. When we graph MTF we chart contrast dropping from 100 to 0 against Spatial frequency (Nyquist frequency). Spatial frequency is the ability to resolve over distance and as contrast drops this ability gets weaker. Plotting this in X&Y gives us the total systems contrast and its ability to faithfully reproduce into the distance. This is especially important in semi-autonomous or autonomous driving vehicles as the focus will be the horizon and all images in the focal plane will need to be detectable both in shape and in size.

Obscurations produced by the method of the invention have resulted in a remarkable improvement in system MTF as compared to the same production model with a normal frit obscuration.

Embodiment 1

A laminated windshield is comprised of a standard transparent soda-lime glass, 2.5 mm thick, exterior glass layer and a 2.1 mm thick soda-lime solar green interior glass layer. The surface two of the outer glass layer has an IR reflecting coating with a 6 mm edge deletion. A sheet of 20 μm black substantially opaque NPPVB is cut to shape and inserted into the laminate with a sheet of 0.76 mm PVB interlayer. The assembled laminated is processed, using standard automotive laminating equipment.

Embodiment 2

A laminated panoramic windshield illustrated is comprised of a standard transparent soda-lime glass, 2.5 mm thick, exterior glass layer and a 2.1 mm thick soda-lime solar green interior glass layer. The surface two of the outer glass layer has an IR reflecting coating with a 6 mm edge deletion. A sheet of 20 μm black substantially opaque NPPVB is cut to shape to form the black periphery band obscuration. A second sheet of 20μ black substantially opaque NPPVB is cut to shape to form the black camera area obscuration located toward the top center of the windshield. Both obscurations are inserted into the laminate with a sheet of 0.76 mm solar absorbing PVB interlayer. The assembled laminated is processed, using standard automotive laminating equipment.

Embodiment 3

A laminated panoramic roof is comprised of a standard transparent soda-lime glass, 2.5 mm thick, exterior glass layer and a 2.1 mm thick soda-lime solar green interior glass layer. The surface two of the outer glass layer has an IR reflecting coating with a 6 mm edge deletion. A sheet of 20 μm black substantially opaque NPPVB is cut to shape and inserted into the laminate with a sheet of 0.76 mm PVB interlayer. A black frit obscuration is printed on the surface four of the interior glass layer. The assembled laminated is processed, using standard automotive laminating equipment.

Embodiment 4

A laminated panoramic roof is comprised of a standard transparent soda-lime glass, 2.5 mm thick, exterior glass layer and a 2.1 mm thick soda-lime solar green interior glass layer. The surface two of the outer glass layer has an IR reflecting coating with a 6 mm edge deletion. A sheet of 20 μm black substantially opaque NPPVB is cut to shape and inserted into the laminate adjacent to the surface two of the exterior glass layer. A layer of SPD film, with busbars on opposite ends, is sandwiched between two layers of 0.36 mm thick plastic bonding interlayer. The SPD film has a light transmittance of 20% in the ON state and 2% in the OFF, unpowered state. A black frit obscuration is printed on the surface four of the interior glass layer. The assembled laminated is processed, using standard automotive laminating equipment.

Embodiment 5

A laminated panoramic roof is comprised of a standard transparent soda-lime glass, 2.5 mm thick, exterior glass layer and a 0.7 mm thick chemically tempered aluminosilicate interior glass layer. The surface two of the outer glass layer has an IR reflecting coating with a 6 mm edge deletion. Two sheets of 20 µm black substantially opaque NPPVB are cut to shape and inserted into the laminate adjacent to the surface two and surface three of glass. A layer of SPD film, with busbars on opposite ends, is sandwiched between two layers of 0.36 mm thick plastic bonding interlayer. The SPD film has a light transmittance of 20% in the ON state and 2% in the OFF, unpowered state. The assembled laminated is processed, using standard automotive laminating equipment.

Embodiment 6

A windshield comprising a ceramic frit black band and a thin plastic adhesive backed die cut insert camera obscuration applied to surface number two.

Embodiment 7

A windshield comprising a ceramic frit black band and a thin plastic adhesive backed die cut insert camera obscuration applied to the surface number two and surface number four.

Embodiment 8

A windshield comprising a ceramic frit black band and a thin plastic adhesive backed die cut insert camera obscuration applied to surface number two and surface number four and further comprising a wedge/shaped plastic interlayer.

Embodiment 9

A windshield comprising a ceramic frit black band and a thin plastic adhesive backed die cut insert camera obscuration applied to the number 2 surface and number 4 surface and further comprising two wedge/shaped plastic interlayers sandwiching between them a infra-red heat reflecting PET film.

It must be understood that this invention is not limited to the embodiments described and illustrated above. A person skilled in the art will understand that numerous variations and/or modifications can be carried out that do not depart from the spirit of the invention, which is only defined by the following claims.

What is claimed is:

1. A laminated glazing having at least one obscuration area, comprising:
    at least two glass layers, an outer glass layer and an inner glass layer, each of them having two oppositely disposed major faces;
    at least one plastic interlayer serving to bond corresponding major faces of the outer and inner glass layers; and
    an obscuration consisting of a thin sheet cut to size to said at least one obscuration area, said thin sheet being formed from an opaque plastic material having at least one cutout;
    wherein the obscuration is a camera obscuration;
    wherein the obscuration is inserted between adjacent layers of the laminated glazing such that said adjacent layers are partially in direct contact with one another in said at least one obscuration area; and
    wherein the thickness of said obscuration is less than or equal to about 70 µm such that there is no thickness compensation.

2. The laminated glazing of claim 1 wherein said obscuration comprises a non-plasticized PVB.

3. The laminated glazing of claim 1, wherein said opaque plastic material is a partially plasticized PVB.

4. The laminated glazing of claim 1, wherein the thickness of the obscuration is less than or equal to about 50 µm.

5. The laminated glazing of claim 1, wherein said obscuration is in contact with one glass layer of said at least two glass layers.

6. The laminated glazing of claim 5, wherein said glass layer in contact with the obscuration is at least one of the following: a cold bent glass layer, a chemically tempered glass layer, and a coated glass layer.

7. The laminated glazing of claim 1, further comprising an IR reflecting layer.

8. The laminated glazing of claim 1, further comprising a variable light transmittance layer.

9. A vehicle comprising the laminated glazing of claim 1.

10. The laminated glazing of claim 1, further comprising a ceramic frit black band.

11. The laminated glazing of claim 1, wherein the laminated glazing is a vehicle glazing, and wherein the vehicle glazing is a windshield or a roof window.

12. The laminated glazing of claim 1, wherein the laminated glazing is a windshield; and further comprising a second camera obscuration, the two camera obscurations being placed between different layers of the laminated glazing.

13. The laminated glazing of claim 1, further comprising an adhesion promoter or optical adhesive applied to the obscuration.

14. A laminated glazing having at least one camera obscuration area, comprising:
    two glass layers, an outer glass layer and an inner glass layer, each of them having two oppositely disposed major faces;
    a plastic interlayer serving to bond corresponding major faces of outer and inner glass layers; and
    an obscuration comprising a PVB thin sheet, the thin sheet is cut to size to said at least one camera obscuration area;
    wherein the PVB thin sheet is inserted into the laminated glazing between one of the glass layers and the plastic interlayer such that the obscuration having the PVB thin sheet is in direct contact with only one of the glass layers;
    wherein the plastic interlayer and the glass layer which is in direct contact with the obscuration are partially in direct contact with one another; and
    wherein the thickness of said PVB thin sheet is less than or equal to about 70 µm such that there is no thickness compensation.

15. The laminated glazing of claim 14, wherein the plastic interlayer is in contact with the obscuration.

16. The laminated glazing of claim 14, wherein the thickness of the PVB thin sheet is less than or equal to about 50 μm.

17. The laminated glazing of claim 14, wherein the glass layer in direct contact with the obscuration is the outer glass layer.

18. The laminated glazing of claim 14, further comprising a ceramic frit black band.

19. The laminated glazing of claim 18, wherein the camera obscuration overlaps the ceramic frit black band.

20. The laminated glazing of claim 14, further comprising an IR reflecting layer and a second plastic interlayer; wherein the IR reflecting layer is sandwiched between plastic interlayers.

21. The laminated glazing of claim 14, wherein the outer glass layer has an IR reflecting coating.

* * * * *